US 11,086,351 B2

United States Patent
Tian et al.

(10) Patent No.: US 11,086,351 B2
(45) Date of Patent: Aug. 10, 2021

(54) SELF-LOCKING MECHANISM AND ELECTRONIC DEVICE WITH THE SAME

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Wenhong Tian, Beijing (CN); Zhanshan Ma, Beijing (CN); Zhiyu Sun, Beijing (CN); Dong Chen, Beijing (CN); Hao Zhang, Beijing (CN); Lili Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 266 days.

(21) Appl. No.: 16/326,112

(22) PCT Filed: Apr. 13, 2018

(86) PCT No.: PCT/CN2018/082994
§ 371 (c)(1),
(2) Date: Feb. 15, 2019

(87) PCT Pub. No.: WO2018/192422
PCT Pub. Date: Oct. 25, 2018

(65) Prior Publication Data
US 2019/0187743 A1    Jun. 20, 2019

(30) Foreign Application Priority Data
Apr. 18, 2017   (CN) .......................... 201710253772.X

(51) Int. Cl.
*G05G 1/08* (2006.01)
*G05G 5/12* (2006.01)
(Continued)

(52) U.S. Cl.
CPC ............... *G05G 5/12* (2013.01); *F16H 19/04* (2013.01); *F16H 35/00* (2013.01);
(Continued)

(58) Field of Classification Search
CPC ........ Y10T 74/2084; G05G 5/06; G05G 5/18; G05G 5/12; G05G 1/08; G05G 2505/00;
(Continued)

(56) References Cited

U.S. PATENT DOCUMENTS

| 5,541,379 | A | * | 7/1996 | Kim ....................... H01H 21/24 200/566 |
| 7,643,231 | B2 | | 1/2010 | Richards |

(Continued)

FOREIGN PATENT DOCUMENTS

| CN | 201133968 Y | 10/2008 |
| CN | 101390802 A | 3/2009 |

(Continued)

OTHER PUBLICATIONS

International Search Report and English Translation of Box V of the Written Opinion dated Jun. 28, 2018, received for corresponding Chinese Application No. PCT/CN2018/082994.
(Continued)

*Primary Examiner* — Randell J Krug
(74) *Attorney, Agent, or Firm* — Kinney & Lange, P.A.

(57) ABSTRACT

A self-locking mechanism includes: a housing having a through hole and a dodge hole; an elastic member in the dodge hole, the elastic member being connected to a wall of the dodge hole and having a free end capable of swinging in a thickness direction of the housing; a first engaging member
(Continued)

on the elastic member; a knob on an outer side of the housing and having one end passing through the through hole; a plurality of second engaging members on a side of the knob adjacent to the housing; wherein the first engaging member may be engaged with or disengaged from one of the second engaging members under an action of an elastic deformation of the elastic member as the knob rotates; and a driven member on an inner side of the housing and fixedly connected with the knob so as to be rotated under driving of the knob.

14 Claims, 5 Drawing Sheets

(51) Int. Cl.
　　　*F16H 19/04*　　　(2006.01)
　　　*F16H 35/00*　　　(2006.01)
　　　*G02B 27/01*　　　(2006.01)
　　　*G05G 5/18*　　　(2006.01)
(52) U.S. Cl.
　　　CPC .......... *G02B 27/0176* (2013.01); *G05G 5/18* (2013.01); *F16H 2035/005* (2013.01); *G02B 2027/0154* (2013.01); *G05G 1/08* (2013.01); *G05G 2505/00* (2013.01)

(58) Field of Classification Search
　　　CPC .... F16H 19/04; F16H 35/00; F16H 2035/005; G02B 27/0176; G02B 2027/0154
　　　USPC ........................................................ 74/473.3
　　　See application file for complete search history.

(56) References Cited

U.S. PATENT DOCUMENTS

| | | | |
|---|---|---|---|
| 8,740,827 | B2 | 6/2014 | Wu |
| 10,672,571 | B2 * | 6/2020 | Deng .................... H01H 19/14 |

FOREIGN PATENT DOCUMENTS

| | | |
|---|---|---|
| CN | 201204973 Y | 3/2009 |
| CN | 103084693 A | 5/2013 |
| CN | 103123055 A | 5/2013 |
| CN | 205333966 U | 6/2016 |
| CN | 106405861 A | 2/2017 |
| CN | 106444025 A | 2/2017 |
| CN | 106842583 A | 6/2017 |
| EP | 2065749 A2 | 11/2008 |

OTHER PUBLICATIONS

First Chinese Office Action dated Sep. 3, 2018, received for corresponding Chinese Application No. 201710253772.X.

* cited by examiner

SELF-LOCKING MECHANISM AND ELECTRONIC DEVICE WITH THE SAME

CROSS-REFERENCE TO RELATED APPLICATION

The present application is the national phase of PCT Application No. PCT/CN2018/082994 filed on Apr. 13, 2018, which in turn claims the benefit of Chinese Patent Application No. 201710253772.X filed on Apr. 18, 2017 in the State Intellectual Property Office of China, the whole disclosure of which is incorporated herein by reference.

TECHNICAL FIELD

The present disclosure relates to a field of self-locking technology, and in particular, to a self-locking mechanism and an electronic device with the same.

BACKGROUND

Most products in the related art have adjustment mechanisms for adjusting a distance between components or a position of a component relative to another/other component/components. For example, a VR (Virtual Reality) helmet product is provided with an eye distance adjustment mechanism or an object distance adjustment mechanism for adjusting the distance of an objective lens or the distance of the eye lens. A gear adjustment mechanism is used as the eye distance adjustment mechanism or the object distance adjustment mechanism in the VR helmet product in the related art. After a position adjustment to a gear mechanism in the related art is completed, a knob often reversely rotates when such an adjustment mechanism is collided, which causes a rack meshed with the gear to move backward in its stroke, thereby influencing user's operation effect.

SUMMARY

According to an aspect of the present disclosure, there is provided a self-locking mechanism comprising: a housing having a through hole and a dodge hole; an elastic member in the dodge hole, the elastic member being connected to a wall of the dodge hole and having a free end capable of swinging in a thickness direction of the housing; a first engaging member on the elastic member; a knob on an outer side of the housing and having one end passing through the through hole; a plurality of second engaging members on a side of the knob adjacent to the housing; wherein the first engaging member may be engaged with or disengaged from one of the second engaging members under an action of an elastic deformation of the elastic member as the knob rotates; and a driven member on an inner side of the housing and fixedly connected with the knob so as to be rotated under driving of the knob.

In an embodiment of the present disclosure, the plurality of second engaging members are equidistant from a center of rotation of the knob.

In an embodiment of the present disclosure, the driven member is a gear; and a number of teeth of the gear is an integer multiple of a number of the second engaging members.

In an embodiment of the present disclosure, the number of teeth of the gear is equal to the number of the second engaging members.

In an embodiment of the present disclosure, the self-locking mechanism further comprises a rack; and the gear is meshed with the rack such that the gear may drive the rack to move when rotating.

In an embodiment of the present disclosure, the knob and the gear are fixedly connected with each other via a screw.

In an embodiment of the present disclosure, the first engaging member is a protrusion and each of the second engaging members is a groove.

In an embodiment of the present disclosure, the first engaging member is a hemispherical protrusion and each of the second engaging members is a hemispherical groove.

In an embodiment of the present disclosure, the elastic member is integrally formed onto the housing.

In an embodiment of the present disclosure, the elastic member is an elongated elastic piece, a length direction of which is set toward a center of rotation of the knob, and the free end of which extends to an edge of the through hole.

In an embodiment of the present disclosure, the other end of the elongated elastic piece except for the free end is connected to the wall of the dodge hole.

In an embodiment of the present disclosure, the self-locking mechanism further comprises a limiting ring disposed at a peripheral edge of the through hole and on a side of the through hole adjacent to the knob; wherein the limiting ring comprises a first section and a second section that are separated from each other; the first section is disposed on the housing, and the second section is disposed on the free end of the elongated elastic piece;

wherein the first engaging member is located on the second section.

In an embodiment of the present disclosure, the limiting ring is tightly fitted with an end of the knob that passes through the through hole.

In an embodiment of the present disclosure, the dodge hole and the through hole are in communication with each other.

According to an aspect of the present disclosure, there is provided an electronic device comprising the above mentioned self-locking mechanism.

BRIEF DESCRIPTION OF THE DRAWINGS

In order to more clearly describe the technical solutions of the exemplary embodiments of the present disclosure or in the related art, the drawings used in description of the exemplary embodiments of the present disclosure or the related art will be briefly described below. Obviously, the drawings in the following description are only some of the exemplary embodiments of the present disclosure. Those skilled in the art may also obtain other drawings based on these drawings without any inventive efforts.

DETAILED DESCRIPTION OF EMBODIMENTS

The technical solutions of the exemplary embodiments of the present disclosure are clearly and completely described in the following with reference to the accompanying drawings in the exemplary embodiments of the present disclosure. It is obvious that the described exemplary embodiments are only some of the exemplary embodiments of the present disclosure, instead of all of the exemplary embodiments. All other embodiments obtained by those skilled in the art based on the exemplary embodiments of the present disclosure without an inventive effort belong to the protective scope of the disclosure.

Figure 1:
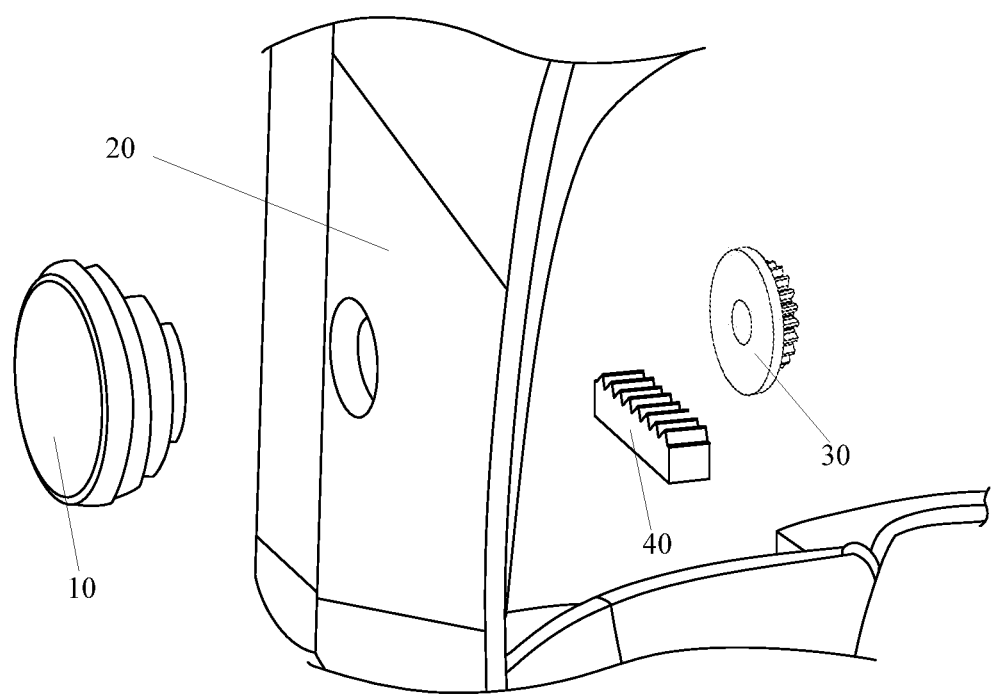
FIG. 1 is a schematic structural view of an adjustment mechanism in the related art.

As shown in FIG. 1, a knob 10 is disposed on an outer side of a housing 20 and a gear 30 is disposed on an inner side of the housing 20. The knob 10 is fixedly connected with the gear 30 via a through hole in the housing 20, and the gear 30 is meshed with a rack 40. The knob 10 is rotated (by the user) to drive the gear 30 to rotate, while the rotation of the gear 30 drive the rack 40 to move. If the rack 40 is connected with a component such as an objective lens and an eye lens, a distance, such as an object distance or an eye distance of a VR helmet, may be adjusted.

According to a general concept of the present disclosure, there is provided a self-locking mechanism and an electronic device with the same, the self-locking mechanism comprises: a housing having a through hole and a dodge hole; the dodge hole is provided therein an elastic member which is connected to a wall of the dodge hole and has a free end capable of swinging in a thickness direction of the housing, and the elastic member is provided with a first engaging member; a knob disposed on an outer side of the housing and having one end passing through the through hole, the knob being provided with a plurality of second engaging members on a side of the knob adjacent to the housing; the first engaging member may be engaged with or disengaged from one of the second engaging members under an action of an elastic deformation of the elastic member as the knob rotates; and a driven member disposed on an inner side of the housing and fixedly connected with the knob so as to be rotated under driving of the knob.

According to the self-locking mechanism and the electronic device of exemplary embodiments of the present disclosure, an elastic member is disposed in the dodge hole in the housing of self-locking mechanism, and the elastic member is provided thereon with a first engaging member, and the knob is correspondingly provided with a plurality of second engaging members on a side of the knob, which side is adjacent to the housing. When the knob is rotated, the first engaging member may be engaged with or disengaged from the plurality of the second engaging members successively. When the knob is rotated to a certain position, the first engaging member will be engaged with one of the second engaging members, thereby preventing the knob from reversely rotating when the user releases the knob and thus preventing the driven member from moving backward in its stroke. On the other hand, as the elastic member has certain elasticity, the user may disengage the first engaging member from the second engaging member by resisting the engaging force therebetween and continues to turn the knob.

Figure 3:
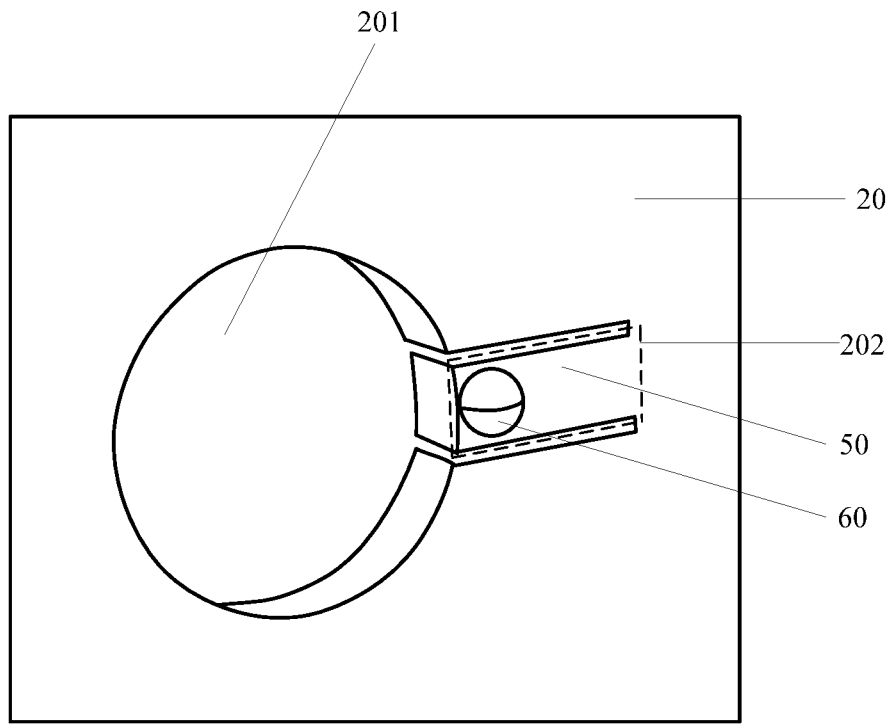
FIG. 3 is a schematic structural view of a housing of a self-locking mechanism according to an exemplary embodiment of the present disclosure.

The embodiment of the present disclosure provides a self-locking mechanism, as shown in FIG. 2, FIG. 5, FIG. 7, and FIG. 8 comprising:

a housing 20 having a through hole 201 and an dodge hole 202, as shown in FIG. 3; an elastic member 50 is disposed in the dodge hole 202 and is connected to a wall of the dodge hole 202. The elastic member 50 has a free end which is capable of swinging in a thickness direction of the housing 20, and the elastic member 50 is provided with a first engaging member 60 thereon.

The dodge hole 202 may be a through hole penetrating through the housing 20 (as shown in FIG. 3), or may be a blind hole that does not penetrate through the housing 20, as long as the free end of the elastic member 50 is capable of swinging in the thickness direction of the housing 20. In case that the dodge hole 202 is a blind hole, a thickness of the elastic member 50 is smaller than a depth of the dodge hole 202 such that the free end of the elastic member 50 is capable of swinging. The through hole 201 may be communicated with the dodge hole 202, as shown in FIG. 3, or may not be communicated with the dodge hole 202, to which there is no limitation.

Regarding the provision of the free end of the elastic member 50 being capable of swinging in the thickness direction of the housing 20, it is specifically possible that a material of the elastic member 50 is an elastic material such that the free end of the elastic member 50 may be capable of swinging in the thickness direction of the housing 20; or that the elastic member 50 is in an elongated shape such that the free end of the elastic member 50 may be capable of swinging in the thickness direction of the housing 20.

The first engaging member 60 may be of any specific types, to which there is no limitation. For example, the first engaging member 60 may be a groove or a protrusion.

Figure 9:
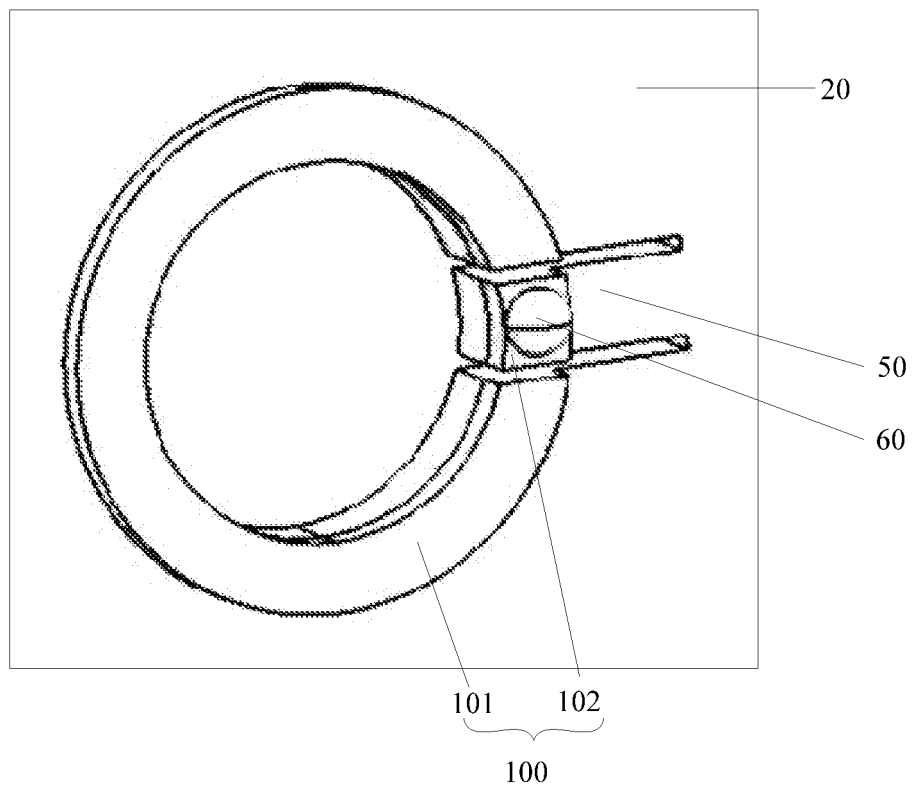
FIG. 9 is a schematic structural view of a through hole on a housing according to the exemplary embodiment of the present disclosure, a limiting ring is provided on the through hole.

It should be noted that FIG. 3 and FIG. 9 of the present disclosure illustrate an outside of the housing 20.

Figure 4:
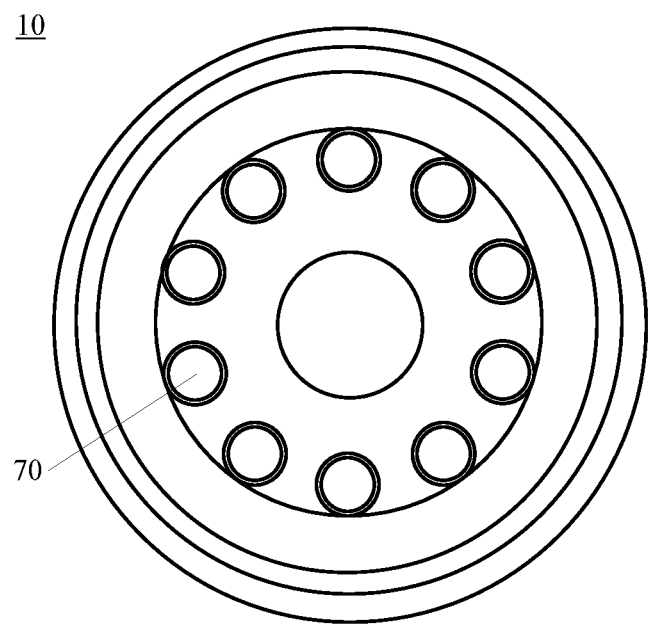
FIG. 4 is a plan view of a side of a knob of a self-locking mechanism according to an exemplary embodiment of the present disclosure, which side of the knob is near the housing.

The self-locking mechanism further comprises a knob 10. As shown in FIG. 4, the knob 10 is disposed on an outer side of the housing 20 and has one end passing through the through hole 201, the knob 10 is provided with a plurality of second engaging members 70 on its side adjacent to the housing 20. All of the second engaging members 70 are equidistant from a center of rotation of the knob 10. The first engaging member 60 may be engaged with or disengaged from various second engaging members 70 under the action of deformation of the elastic member 50 as the knob 10 rotates.

Figure 2:
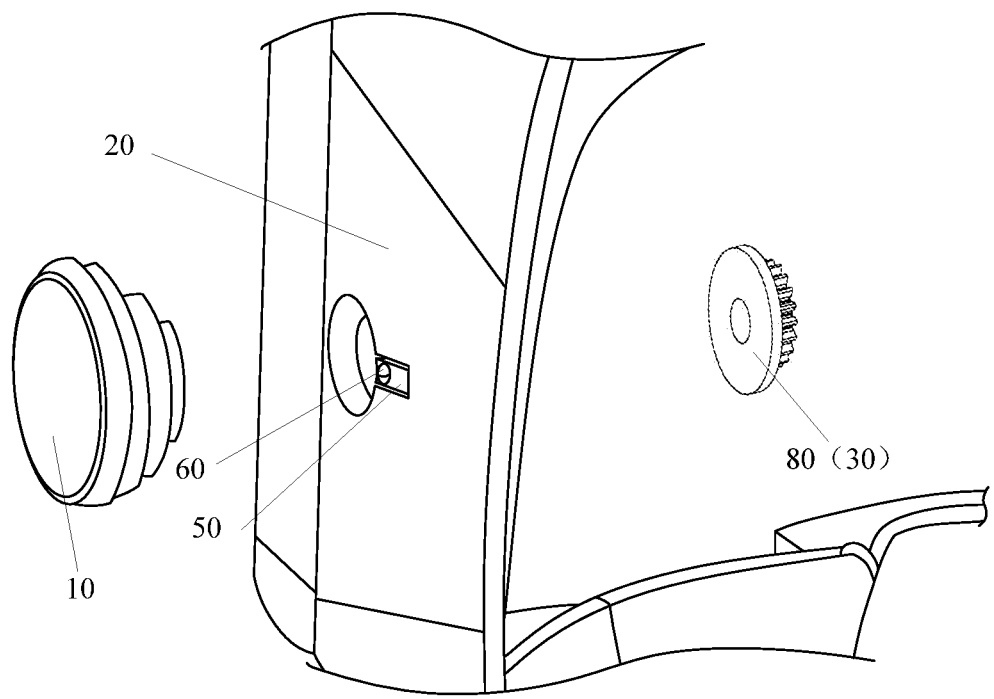
FIG. 2 is a schematic structural view of a self-locking mechanism according to an exemplary embodiment of the present disclosure.

The second engaging member 70 may be of any types, to which there is no limitation. However, it is limited that the first engaging member 60 and the second engaging member 70 are supposed to be engaged with or disengaged from each other, they needs to be fitted with each other. For example, as shown in FIG. 2, when the first engaging member 60 is a groove, the second engaging member 70 is a protrusion matched with the groove correspondingly; when the first engaging member 60 is a protrusion, the second engaging member 70 is a groove matched with the protrusion correspondingly.

Here, the plurality of second engaging members 70 are equidistant from the center of rotation of the knob 10. That is, the plurality of second engaging members 70 are arranged in a circular shape, the center of which is the rotation center. There is no limitation to the number of the second engaging members 70, which may be appropriately set according to a size of the knob 10. The distance between the second engaging member 70 and the center of rotation of the knob 10 is equal to the distance between the first engaging member 60 and the center of rotation of the knob 10 so that the first engaging member and the second engaging member may be engaged. In addition, the knob 10 may be rotated clockwise or counterclockwise, to which there is no limitation. The rotation direction of the knob 10 may be selected according to the needs of the driven member 80.

On this basis, the plurality of second engaging members 70 may be distributed uniformly or non-uniformly on a circular circumference centered on the rotation center.

It should be understood by those skilled in the art that, in order to enable the first engaging member 60 to be snapped into or separated from one of the second engaging members 70 under the elastic deformation of the elastic member 50, the first engaging member 60 is disposed on a side of the housing 20 adjacent to the knob 10 and the second engaging members 70 are disposed on a side of the knob 10 adjacent to the housing 20. A position of the first engaging member 60 is fixed. When the knob 10 is rotated, the plurality of second engaging members 70 on the knob 10 are also rotated correspondingly. During the rotation of the knob 10, the first engaging member 60 is engaged or disengaged from one of the second engaging members 70. When the knob 10 is rotated until that the first engaging member 60 is engaged with one of the second engaging members 70, and no external force is acted on the knob 10, the knob 10 doesn't reversely rotate.

The self-locking mechanism further comprises the driven member 80. The driven member 80 is disposed on an inner side of the housing 20 and fixedly connected with the knob 10 so as to be rotated with the rotation of the knob 10.

In another exemplary embodiment of the present disclosure, the knob 10 is disposed on an outer side of the housing 20, and one end of the knob 10 is fixed to the driven member 80 via the through hole 201 in the housing 20, so that the knob 10, the driven member 80 and the housing 20 are assembled together.

Here, the driven member 80 may be of any type, to which there is no limitation and which may be set as needed. For example, the driven member 80 may be a gear, as shown in FIG. 3, or a turning disc or the like.

Figure 6:
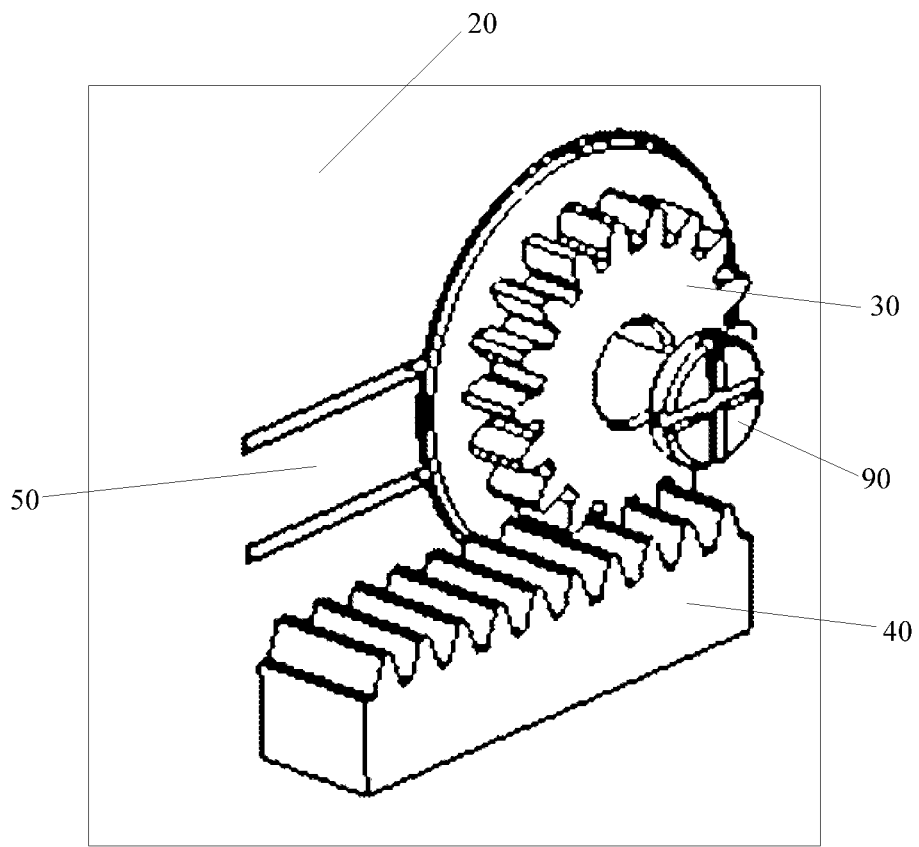
FIG. 6 is a schematic structural view of a gear and a rack provided by the exemplary embodiment of the present disclosure.
Figure 7:
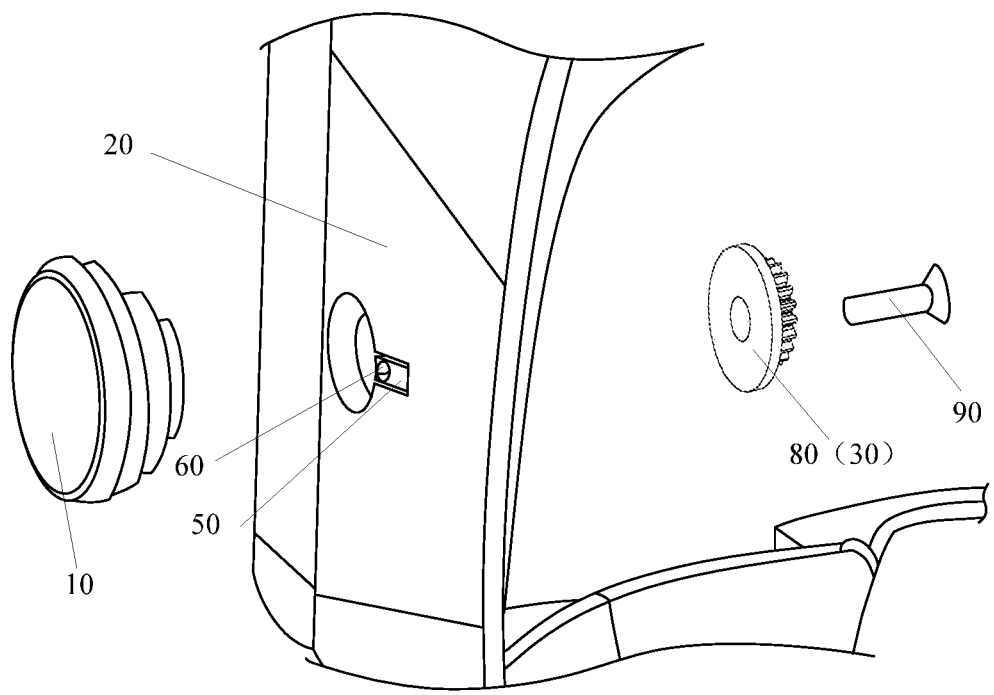
FIG. 7 is still another schematic structural view of the self-locking mechanism according to the exemplary embodiment of the present disclosure, in which the screw for fixingly connecting the driven member and the knob is illustrated.
Figure 8:
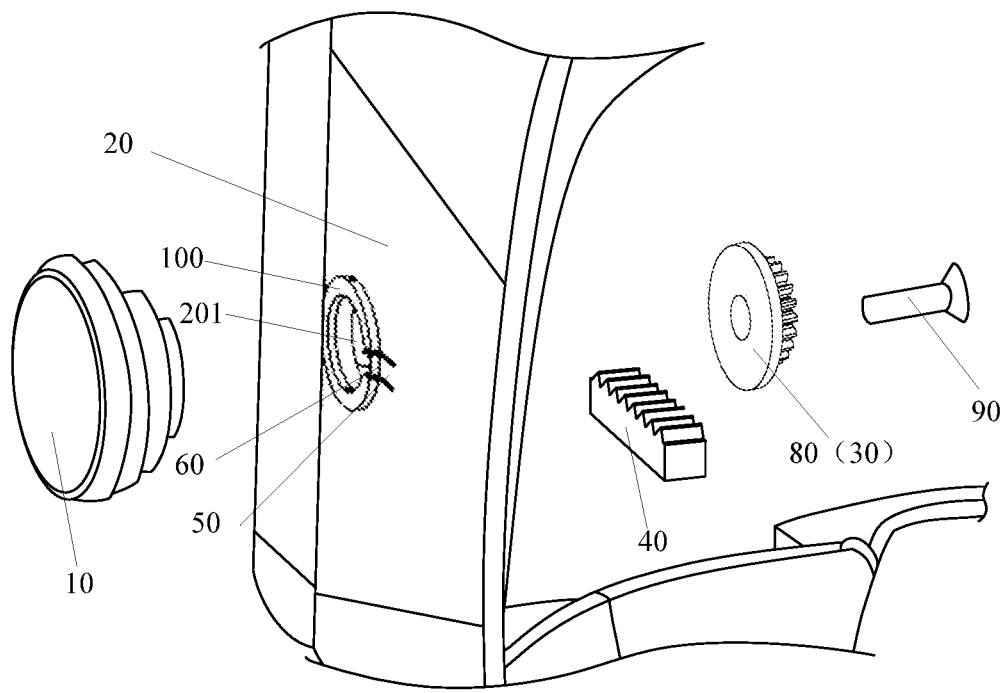
FIG. 8 is still another schematic structural view of the self-locking mechanism according to the exemplary embodiment of the present disclosure, in which the limiting ring is illustrated.

In addition, there is no limitation to the manner of fixing connection between the driven member 80 and the knob 10. For example, the driven member 80 and the knob 10 may be fixedly connected with each other via a screw, as shown in FIG. 6-8, or the driven member 80 and the knob 10 may be directly welded together.

According to the self-locking mechanism of an exemplary embodiment of the present disclosure, an elastic member 50 is disposed in the dodge hole 202 in the housing 20 of self-locking mechanism. The elastic member 50 is provided with the first engaging member 60, while the knob 10 is correspondingly provided with a plurality of second engaging members 70 on a side of the knob 10 adjacent to the housing 20. When the knob 10 is rotated, the first engaging member 60 may be engaged with or disengaged from the plurality of the second engaging members 70 successively. When the knob 10 is rotated to a certain position, the first engaging member 60 will be engaged with one of the second engaging members 70, thereby preventing the knob 10 from reversely rotating when the user releases the knob and thus preventing the driven member 80 from moving backward in its stroke. On the other hand, as the elastic member has certain elasticity, the user may disengage the first engaging member from the second engaging member by resisting the engaging force therebetween and continues to turn the knob.

Optionally, as shown in FIG. 2, FIG. 5 to FIG. 8, the driven member 80 is specifically a gear 30; a number of teeth of the gear 30 is an integral multiple of a number of the second engaging members 70.

Here, there is no limitation to the number of teeth of the gear 30. One may select a gear 30 with an appropriate number of teeth according to the number of the second engaging members 70. For example, the number of teeth of the gear 30 may be equal to, twice or 3 times (and the like) of the number of the second engaging members 70 on the knob 10, to which there is no limitation. In case that the number of teeth of the gear 30 is equal to the number of the second engaging members 70, every time the gear 30 is rotated by 1 tooth, the one second engaging member 70 currently engaged with the first engaging member 60 is separated from the first engaging member 60, and another one second engaging member 70 adjacent to the one second engaging member 70 is in turn engaged with the first engaging member 60; in case that the number of teeth of the gear 30 is twice of the number of the second engaging members 70, every time the gear 30 is rotated by 2 teeth, the one second engaging member 70 currently engaged with the first engaging member 60 is separated from the first engaging member 60, and another one second engaging member 70 adjacent to the one second engaging member 70 is in turn engaged with the first engaging member 60. By analogy, other cases will not be repeated here.

In another exemplary embodiment of the present disclosure, since the driven member 80 is fixedly connected with the knob 10, when the knob 10 is rotated, the driven member 80 is also rotated under the driving of the rotating knob 10. Based on this, when the driven member 80 is a gear, in order to ensure that all of the second engaging members 70 on the knob 10 may be engaged with the first engaging member 60 as the gear 30 is rotated, it is provided that the number of teeth of the gear 30 is an integer multiple of the number of the second engaging members 70.

In order to accurately control the gear 30, it is ensured that, every time the gear 30 is rotated by one tooth, the self-locking mechanism may be self-locking to prevent the gear 30 from moving backward in its stroke. Therefore, according to another exemplary embodiment of the present disclosure, further optionally, the number of teeth of the gear 30 is equal to the number of the second engaging members 70, such that when the gear 30 is rotated by one tooth, the first engaging member 60 is engaged with one of the second engaging members 70, thereby preventing the gear 30 from being reversely rotated.

Figure 5:
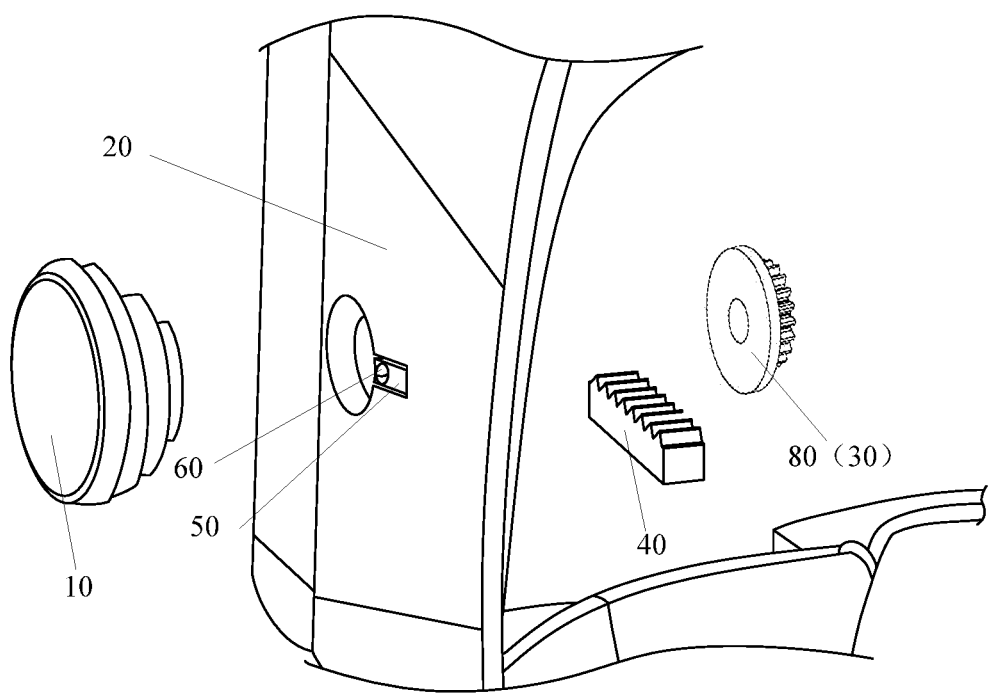
FIG. 5 is another schematic structural view of the self-locking mechanism according to exemplary embodiment of the present disclosure, in which a gear serving as the driven member and a rack to be meshed with the gear are illustrated.

Further optionally, as shown in FIGS. 5, 6, and 8, the self-locking mechanism further comprises a rack 40 which is meshed with the gear 30 such that the rotation of the gear 30 drives the rack 40 to move.

It should be noted that FIG. 6 of the present disclosure illustrates an inner side of the housing 20, in which the gear and the rack is meshed together.

The rack 40 may be disposed on other components, and when the rack 40 is moved, the components on which the rack 40 is provided will be moved correspondingly.

In another exemplary embodiment of the present disclosure, the self-locking mechanism further comprises the rack 40 which is meshed with the gear 30. Therefore, the rotation of the knob 10 will drive the gear 30 to rotate, while the rotation of the gear 30 will drive the rack 40 to move, thus a rotation motion may be transformed into a linear motion.

On this basis, in case that the rack 40 is connected with the eye lens or objective lens of the VR helmet, at the time to adjust the eye distance or the object distance thereof, it is needed to turn the knob 10. The knob 10 will drive the gear 30 to rotate, and the rotation of the gear 30 will again cause the rack 40 to move, thereby achieving an adjustment to the object distance or the eye distance. When the knob 10 is rotated, one of the second engaging members 70 on the knob 10 is engaged with the first engaging member 60 on the housing 20, the self-locking mechanism achieves an effect of self-locking. Therefore, the eye lens or the objective lens does not move, thereby fixing the position of the eye lens or the objective lens, and thus the eye distance or the object distance.

Alternatively, as shown in FIGS. 6-8, the knob 10 is fixedly connected to the gear 30 through a screw 90.

Here, the knob 10 is fixedly connected with the gear 30 via the through hole 201 in the housing 20 by a screw 90, thus the gear 30, the knob 10, the housing 20 and the screw 90 are assembled together.

The knob 10 and the gear 30 may be fixedly connected with each other by one or more screws 90 as long as the screw(s) doesn't or don't interfere with the rotation of the knob 10, which rotation further drives the gear 30 to rotate. When the knob 10 and the gear 30 are fixedly connected with each other by one screw 90, it is possible to fixedly to use the screw 90 to connect the center of the knob 10 with the center of the gear 30.

In another exemplary embodiment of the present disclosure, since the knob 10 and the gear 30 are fixedly connected with each other by the screw 90, the gear 30 will be rotated synchronously when the knob 10 is rotated.

In another exemplary embodiment of the present disclosure, since the first engaging member 60 is disposed on the elastic member 50, if the thickness of the elastic member 50 is relatively small and the first engaging member 60 is a groove, the depth of the groove may be small correspondingly. Therefore, the first engaging member 60 and the second engaging member 70 may not be tightly engaged with each other, causing the self-locking effect between the knob 10 and the housing 20 not to be strong enough. Based on this, the exemplary embodiment of the present disclosure may be selected as shown in FIG. 2 to FIG. 5 and FIG. 7 to FIG. 9, the first engaging member 60 is a protrusion, and the second engaging members 70 are grooves, thus regardless of the thickness of the elastic member 50, the projection being provided on the elastic member 50 may always be tightly engaged with the groove on the knob 10, thereby obtaining an excellent self-locking effect between the knob 10 and the housing 20. At the same time, since the second engaging members 60 provided on the knob 10 are grooves, they do not adversely effect the rotation of the knob 10.

Here, there is no limitation to the shape of the protrusion and that of the groove as long as the protrusions and the grooves may be matched with each other.

Further optionally, the protrusion is hemispherical, the grooves to be fitted with the protrusion are also hemispherical.

In another exemplary embodiment of the present disclosure, in case that the protrusion is hemispherical, on one hand, the protrusion is easy to manufacture, and on the other hand, in order to ensure that the groove and the protrusion may be engaged with each other, the groove is also hemispherical, thus the groove is easy to manufacture, and the groove and the projection are easy to be separated from each other.

Alternatively, as shown in FIGS. 3 and 9, the elastic member 50 is integrally formed onto the housing 20.

In another exemplary embodiment of the present disclosure, as the elastic member 50 is integrally formed onto the housing 20, on one hand, the elastic member 50 may be simultaneously manufactured with the housing 20, thereby simplifying the manufacturing process of the self-locking mechanism; on the other hand, the elastic member is directly created as the housing 20 is fabricated, which is not only simple in structure, but also cost-effective, and does not require any other auxiliary parts.

Since the plastic is elastic and wear resistant, according to another exemplary embodiment of the present disclosure and further optionally, the material of the housing 20 is plastic. Since the elastic member 50 is integrally formed onto the housing 20, the material of the elastic member 50 is also plastic. When the material of the elastic member 50 is plastic, the elastic member 50 is easy to be deformed elastically.

Optionally, as shown in FIG. 2, FIG. 3 and FIG. 5 to FIG. 9, the elastic member 50 is an elongated elastic piece, and the length direction of the elongated elastic piece is set toward the center of the through hole 201 and the free end of the elongated elastic piece extends to the edge of the through hole 201.

The elongated elastic piece extends to the edge of the through hole 201, and the elongated elastic piece is disposed in the dodge hole 202, that is, the through hole 201 and the dodge hole 202 are in communication with each other. Of course, those skilled in the art will know that the dodge hole 202 may not be communicated with the through hole 201, as long as the first engagement member 60 on the elongated elastic piece in the through hole 201 may be engaged with the second engagement 70 on the knob 10.

In another exemplary embodiment of the present disclosure, since the elongated elastic piece extends to the edge of the through hole 201, the length of the elongated elastic piece may be set relatively long so that the elongated elastic piece may be easily deformed. In addition, when the first engaging member 60 is disposed on the edge adjacent to the free end of the elongated elastic piece, each of the second engaging members 70 is supposed to be matched with the first engaging member 60, such that the distance from each of the second engaging members 70 on the knob 10 to the rotation center of the knob 10 may be reduced so that the knob 10 may be made relatively small in size.

Further optionally, as shown in FIG. 8 and FIG. 9, the self-locking mechanism further comprises a limiting ring 100 disposed at a peripheral edge of the through hole 201 and on a side of the through hole adjacent to the knob 10; the limiting ring 100 comprises a first section 101 and a second section 102 that are separated from each other; the first section 101 is disposed on the housing 20, and the second section 102 is disposed on the free end of the elongated elastic piece; the first engaging member 60 is located near the second section 102.

There is no limitation to the material of the limiting ring 100, and the material may be the same as or different from that of the housing 20.

In another exemplary embodiment of the present disclosure, the limiting ring 100 is disposed on the peripheral edge of the through hole 201 and serves to limit the knob 10 so as to prevent the knob 10 from waggling up and down, left and right, only allowing the knob 10 to rotate.

Embodiments of the present disclosure also provide an electronic device comprising the above self-locking mechanism.

The electronic device may be of any types to which there is no limitation. It may be any electronic device comprising the above self-locking mechanism. Specifically, the electronic device may be a VR helmet or a VR glasses, and the like.

Embodiments of the present disclosure provide an electronic device comprising the self-locking mechanism, an elastic member 50 is disposed in the dodge hole 202 in the housing 20 of self-locking mechanism, and the elastic member 50 is provided with the first engaging member 60, and the knob 10 is correspondingly provided with a plurality of second engaging members 70 on a side of the knob 10 adjacent to the housing 20. When the knob 10 is rotated, the first engaging member 60 may be engaged with or disengaged from the plurality of the second engaging members 70 successively. When the knob 10 is rotated to a certain position, the first engaging member 60 will be engaged with one of the second engaging members 70, thereby preventing the knob 10 from reversely rotating when the user releases the knob and thus preventing the driven member 80 from moving backward in its stroke. On the other hand, as the elastic member has certain elasticity, the user may disengage the first engaging member from the second engaging member by resisting the engaging force therebetween and continues to turn the knob.

Above is only the specific embodiment of the present disclosure, the scope of the present disclosure is not limited thereto. Those skilled in the art will readily conceive modifications or substitutions within the technical scope of the disclosure, which should be covered within the protective scope of the present disclosure. Therefore, the protective scope of the present disclosure should be defined by the scope of the claims.

What is claimed is:

1. A self-locking mechanism comprising:
a housing having a through hole and a dodge hole;
an elastic member in the dodge hole, the elastic member being connected to a wall of the dodge hole and having a free end capable of swinging in a thickness direction of the housing;
a first engaging member on the elastic member;
a knob on an outer side of the housing and having one end passing through the through hole;
a plurality of second engaging members on a side of the knob adjacent to the housing; wherein the first engaging member may be engaged with or disengaged from one of the second engaging members under an action of an elastic deformation of the elastic member as the knob rotates; and
a driven member on an inner side of the housing and fixedly connected with the knob so as to be rotated under driving of the knob,
wherein the driven member is a gear; and a number of teeth of the gear is an integer multiple of a number of the second engaging members.

2. The self-locking mechanism according to claim 1, wherein,
the plurality of second engaging members are equidistant from a center of rotation of the knob.

3. The self-locking mechanism according to claim 1, wherein,
the number of teeth of the gear is equal to the number of the second engaging members.

4. The self-locking mechanism according to claim 1, wherein,
the self-locking mechanism further comprises a rack; and the gear is meshed with the rack such that the gear may drive the rack to move when rotating.

5. The self-locking mechanism according to claim 1, wherein,
the knob and the gear are fixedly connected with each other via a screw.

6. The self-locking mechanism according to claim 1, wherein,
the first engaging member is a protrusion and each of the second engaging members is a groove.

7. The self-locking mechanism according to claim 6, wherein,
the first engaging member is a hemispherical protrusion and each of the second engaging members is a hemispherical groove.

8. The self-locking mechanism according to claim 1, wherein,
the elastic member is integrally formed onto the housing.

9. The self-locking mechanism according to claim 1, wherein,
the elastic member is an elongated elastic piece, a length direction of which is set toward a center of rotation of the knob, and the free end of which extends to an edge of the through hole.

10. The self-locking mechanism according to claim 9, wherein,
the other end of the elongated elastic piece except for the free end is connected to the wall of the dodge hole.

11. The self-locking mechanism according to claim 9, wherein,
the self-locking mechanism further comprises a limiting ring disposed at a peripheral edge of the through hole and on a side of the through hole adjacent to the knob; wherein the limiting ring comprises a first section and a second section that are separated from each other; the first section is disposed on the housing, and the second section is disposed on the free end of the elongated elastic piece;
wherein the first engaging member is located on the second section.

12. The self-locking mechanism according to claim 11, wherein,
the limiting ring is tightly fitted with an end of the knob that passes through the through hole.

13. The self-locking mechanism according to claim 1, wherein,
the dodge hole and the through hole are in communication with each other.

14. An electronic device comprising the self-locking mechanism according to claim 1.

* * * * *